United States Patent
Fan et al.

(10) Patent No.: US 12,217,663 B2
(45) Date of Patent: Feb. 4, 2025

(54) STATE CONTROL METHOD FOR LIGHT SENSOR AND ELECTRONIC DEVICE

(71) Applicant: Huawei Technologies Co., Ltd., Shenzhen (CN)

(72) Inventors: Jicun Fan, Shanghai (CN); Li Kang, Shanghai (CN); Wei Wang, Shanghai (CN); Haowei Jiang, Shanghai (CN); Ying Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 60 days.

(21) Appl. No.: 17/598,145

(22) PCT Filed: Feb. 29, 2020

(86) PCT No.: PCT/CN2020/077347
§ 371 (c)(1),
(2) Date: May 2, 2022

(87) PCT Pub. No.: WO2020/192362
PCT Pub. Date: Oct. 1, 2020

(65) Prior Publication Data
US 2022/0262304 A1    Aug. 18, 2022

(30) Foreign Application Priority Data
Mar. 26, 2019   (CN) .......................... 201910234614.9

(51) Int. Cl.
*G09G 3/3208* (2016.01)
*H04M 1/02* (2006.01)

(52) U.S. Cl.
CPC ..... *G09G 3/3208* (2013.01); *G09G 2330/027* (2013.01); *G09G 2360/141* (2013.01); *H04M 1/0266* (2013.01)

(58) Field of Classification Search
CPC .......... G09G 3/3208; G09G 2330/027; G09G 2360/141; H04M 1/0266
See application file for complete search history.

(56) References Cited

U.S. PATENT DOCUMENTS

| | | | |
|---|---|---|---|
| 10,789,888 B2 * | 9/2020 | Zhang | ..................... G06F 3/042 |
| 2010/0321339 A1 | 12/2010 | Kimmel | |
| 2018/0063435 A1 | 3/2018 | Cho et al. | |

FOREIGN PATENT DOCUMENTS

| | | |
|---|---|---|
| CN | 1395720 A | 2/2003 |
| CN | 1532790 A | 9/2004 |

(Continued)

*Primary Examiner* — Doon Y Chow

(57) ABSTRACT

A light sensor status control method, includes: a processor (110) determines a display time period and a non-light-emitting time period in a image refresh cycle (501); and the processor (110) controls an optical transmitter of a light sensor (180G) to transmit an optical signal when pixels in a display area that is of an OLED display screen (194) and that corresponds to the light sensor do not emit light in the image refresh cycle, and the processor (110) controls the optical transmitter not to transmit an optical signal when the pixels in the display area that is of the OLED display screen (194) and that corresponds to the light sensor (180G) emits light (502). Therefore, a problem that the screen blinks because the light sensor emits infrared light is alleviated, and a display effect of the screen is improved.

11 Claims, 8 Drawing Sheets

(56) References Cited

FOREIGN PATENT DOCUMENTS

| | | | | |
|---|---|---|---|---|
| CN | 107920142 A | * | 4/2018 | ............... G06F 3/14 |
| CN | 107992163 A | | 5/2018 | |
| CN | 108718349 A | | 10/2018 | |
| CN | 108833625 A | * | 11/2018 | .......... H04M 1/0266 |
| CN | 108897001 A | | 11/2018 | |
| CN | 109192135 A | | 1/2019 | |
| CN | 109194791 A | | 1/2019 | |
| CN | 109410833 A | | 3/2019 | |
| CN | 110134034 A | | 8/2019 | |

* cited by examiner

STATE CONTROL METHOD FOR LIGHT SENSOR AND ELECTRONIC DEVICE

CROSS-REFERENCE TO RELATED APPLICATIONS

This application is a National Stage of International Application No. PCT/CN2020/077347, filed on Feb. 29, 2020, which claims priority to Chinese Patent Application No. 201910234614.9, filed with the Chinese Patent Office on Mar. 26, 2019, which are hereby incorporated by reference in its entirety.

TECHNICAL FIELD

This application relates to the field of terminal technologies, and in particular, to a light sensor status control method and an electronic device.

BACKGROUND

In recent years, with rapid development of the electronic industry and communications technologies, there are an increasing quantity of intelligent terminal devices currently, such as mobile phones, smart speakers, and smart bands, and people's lives become increasingly intelligent. The mobile phone is essential in people's daily life because the mobile phone is portable and can download applications with various functions from the app store. To prevent a touchscreen of the mobile phone from being accidentally touched, a proximity sensor is usually disposed near an earpiece on an upper part of the mobile phone. The proximity sensor is mainly configured to: detect whether an object approaches a particular area of the mobile phone, and drive the mobile phone to perform a corresponding operation. For example, when being disposed near the earpiece, the proximity sensor may determine, in a process in which a user answers a call, whether the face of the user approaches the earpiece; and if the face of the user approaches the earpiece, trigger backlight of the screen to be turned off. This can prevent the screen from being accidentally touched, and further can reduce power consumption.

With maturation of a full-screen technology, screens are produced in mass. A plurality of mobile phone manufacturers have taken the lead in using full-screen designs, bringing brand-new operation experience to mobile phone users. To implement a screen, a proximity sensor originally located near an earpiece on a screen needs to be disposed under a display area of the screen. However, when the proximity sensor is disposed under the display area of the screen, the screen blinks in the display area because an optical transmitter of the light sensor emits infrared light, affecting a display effect of the screen.

SUMMARY

This application provides a light sensor status control method and an electronic device, to alleviate a problem that a screen of a full-screen electronic device blinks because a proximity sensor emits infrared light, thereby improving a display effect of the screen.

According to a first aspect, an embodiment of this application provides a light sensor status control method. The method is applicable to an electronic device that includes a light sensor and an OLED display screen. The method includes: A processor determines, in a image refresh cycle, a display time period in which pixels in a display area that is of the OLED display screen and that corresponds to the light sensor emit light and a non-light-emitting time period in which the pixels in the display area that is of the OLED display screen and that corresponds to the light sensor do not emit light; and the processor controls an optical transmitter of the light sensor to transmit an optical signal in at least a part of the non-light-emitting time period, and controls the optical transmitter not to transmit an optical signal in the display time period.

In this embodiment of this application, the optical transmitter of the proximity sensor of the electronic device transmits an infrared light signal only in at least the part of the non-light-emitting time period, causing no impact on the display area, thereby improving a display effect.

In a possible design, when current brightness of the display screen of the electronic device is greater than a specified brightness value, the electronic device uses DC dimming instead of PWM dimming. Therefore, the processor of the electronic device determines, based on an image refresh frequency of the display screen, the image refresh cycle and duration in which the pixels in the display area corresponding to the light sensor do not emit light; and when obtaining a display synchronization signal at a first moment through monitoring, determines the non-light-emitting time period and the display time period based on the duration in which the pixels in the display area corresponding to the light sensor do not emit light, where a start moment of the image refresh cycle is the first moment.

In this embodiment of this application, the processor of the electronic device may accurately predict the non-light-emitting time period based on the image refresh frequency and the display synchronization signal, to ensure that the optical transmitter of the proximity sensor of the electronic device transmits an infrared light signal only in at least the part of the non-light-emitting time period.

In a possible design, when current brightness of the display screen of the electronic device is less than or equal to the specified brightness value, the electronic device uses PWM dimming instead of DC dimming. Therefore, the processor of the electronic device determines the image refresh cycle based on an image refresh frequency of the display screen; determines, based on the brightness of the display screen and the image refresh frequency of the display screen, a quantity of times that the pixels in the display area that is of the OLED display screen and that corresponds to the light sensor do not emit light in the image refresh cycle and duration in which the pixels in the display area that is of the OLED display screen and that corresponds to the light sensor do not emit light each time; and when obtaining a display synchronization signal at a first moment through monitoring, determines the non-light-emitting time period and the display time period based on the non-light-emitting duration and the quantity of non-light-emitting times, where a start moment of the image refresh cycle is the first moment.

In this embodiment of this application, the processor of the electronic device may accurately predict the non-light-emitting time period based on a frequency of a pulse-width modulation signal, the image refresh frequency, and the display synchronization signal, to ensure that the optical transmitter of the proximity sensor of the electronic device transmits an infrared light signal only in at least the part of the non-light-emitting time period.

In a possible design, if the duration in which the pixels in the display area that is of the OLED display screen and that corresponds to the light sensor is less than preset duration, and the preset duration may be duration needed for transmitting an infrared light signal by the optical transmitter, the processor controls the optical transmitter of the light sensor to transmit optical signals in at least two non-light-emitting time periods, where duration in which the optical transmitter transmits an optical signal in each non-light-emitting time period is less than or equal to duration of the non-light-emitting time period.

In this embodiment of this application, the proximity sensor performs a plurality of times of transmission, to ensure a signal-to-noise ratio of the proximity sensor, and also resolve a problem that the display area blinks due to the light sensor in the conventional technology.

In a possible design, the processor of the electronic device determines the display time period and the non-light-emitting time period based on a signal detected by a visible light sensor. In this embodiment of this application, if a monitoring result of the visible light sensor is that no visible light is received, the processor instructs the optical transmitter of the proximity sensor to start transmitting an infrared light signal; or if a monitoring result of the visible light sensor is that visible light can be received, the processor instructs the optical transmitter of the proximity sensor not to transmit an infrared light signal.

In a possible design, the processor of the electronic device determines the display time period and the non-light-emitting time period based on a signal for controlling the pixels on the display screen to emit light; or determines the display time period and the non-light-emitting time period based on a signal for controlling brightness of the display screen.

In this embodiment of this application, when determining, through monitoring, that a control signal or a pulse-width modulation signal is switched to a low level, the processor instructs the optical transmitter of the proximity sensor to transmit an infrared light signal; or when determining, through monitoring, that a control signal or a pulse-width modulation signal is switched to a high level, the processor instructs the optical transmitter of the proximity sensor not to transmit an infrared light signal.

According to a second aspect, an embodiment of this application provides a light sensor status control method. The method is applicable to an electronic device that includes a light sensor and an OLED display screen. The method includes: A processor determines, in a image refresh cycle, a display time period in which pixels in a display area that is of the OLED display screen and that corresponds to the light sensor emit light and a non-light-emitting time period in which the pixels in the display area that is of the OLED display screen and that corresponds to the light sensor do not emit light; and when the light sensor is in a working mode, the processor controls an optical transmitter of the light sensor to transmit an optical signal in all or a part of the non-light-emitting time period, and controls the optical transmitter not to transmit an optical signal in the display time period.

In this embodiment of this application, the optical transmitter of the proximity sensor of the electronic device transmits an infrared light signal only in at least the part of the non-light-emitting time period, causing no impact on the display area, thereby improving a display effect.

In a possible design, when current brightness of the display screen of the electronic device is greater than a specified brightness value, the electronic device uses DC dimming instead of PWM dimming. Therefore, the processor of the electronic device determines, based on an image refresh frequency of the display screen, the image refresh cycle and duration in which the pixels in the display area corresponding to the light sensor do not emit light; and when obtaining a display synchronization signal at a first moment through monitoring, determines the non-light-emitting time period and the display time period based on the duration in which pixels in the display area corresponding to the light sensor do not emit light, where a start moment of the image refresh cycle is the first moment.

In this embodiment of this application, the processor of the electronic device may accurately predict the non-light-emitting time period based on the image refresh frequency and the display synchronization signal, to ensure that the optical transmitter of the proximity sensor of the electronic device transmits an infrared light signal only in at least the part of the non-light-emitting time period.

In a possible design, when current brightness of the display screen of the electronic device is less than or equal to the specified brightness value, the electronic device uses PWM dimming instead of DC dimming. Therefore, the processor of the electronic device determines the image refresh cycle based on an image refresh frequency of the display screen; determines, based on the brightness of the display screen and the image refresh frequency of the display screen, a quantity of times that the pixels in the display area that is of the OLED display screen and that corresponds to the light sensor do not emit light in the image refresh cycle and duration in which the pixels in the display area that is of the OLED display screen and that corresponds to the light sensor do not emit light each time; and when obtaining a display synchronization signal at a first moment through monitoring, determines the non-light-emitting time period and the display time period based on the non-light-emitting duration and the quantity of non-light-emitting times, where a start moment of the image refresh cycle is the first moment.

In this embodiment of this application, the processor of the electronic device may accurately predict the non-light-emitting time period based on a frequency of a pulse-width modulation signal, the image refresh frequency, and the display synchronization signal, to ensure that the optical transmitter of the proximity sensor of the electronic device transmits an infrared light signal only in at least the part of the non-light-emitting time period.

In a possible design, if the duration in which the pixels in the display area that is of the OLED display screen and that corresponds to the light sensor is less than preset duration, and the preset duration may be duration needed for transmitting an infrared light signal by the optical transmitter, the processor controls the optical transmitter of the light sensor to transmit optical signals in at least two non-light-emitting time periods, where duration in which the optical transmitter transmits an optical signal in each non-light-emitting time period is less than or equal to duration of the non-light-emitting time period.

In this embodiment of this application, the proximity sensor performs a plurality of times of transmission, to ensure a signal-to-noise ratio of the proximity sensor, and also resolve a problem that the display area blinks due to the light sensor in the conventional technology.

In a possible design, if accumulated duration in which the optical transmitter of the light sensor transmits optical signals in the at least two non-light-emitting time periods reaches the preset duration, the optical transmitter of the light sensor is controlled to stop transmitting an optical signal.

In this embodiment of this application, after the proximity sensor completes a single time of proximity light measurement, the optical transmitter of the light sensor stops transmitting an optical signal, that is, the proximity sensor can enter a sleep mode, and enter the working mode only when starting a next time of measurement.

In a possible design, the processor of the electronic device determines the display time period and the non-light-emitting time period based on a signal detected by a visible light sensor. In this embodiment of this application, if a monitoring result of the visible light sensor is that no visible light is received, the processor instructs the optical transmitter of the proximity sensor to start transmitting an infrared light signal; or if a monitoring result of the visible light sensor is that visible light can be received, the processor instructs the optical transmitter of the proximity sensor not to transmit an infrared light signal.

In a possible design, the processor of the electronic device determines the display time period and the non-light-emitting time period based on a signal for controlling the pixels on the display screen to emit light; or determines the display time period and the non-light-emitting time period based on a signal for controlling brightness of the display screen.

In this embodiment of this application, when determining, through monitoring, that a control signal or a pulse-width modulation signal is switched to a low level, the processor instructs the optical transmitter of the proximity sensor to transmit an infrared light signal; or when determining, through monitoring, that a control signal or a pulse-width modulation signal is switched to a high level, the processor instructs the optical transmitter of the proximity sensor not to transmit an infrared light signal.

According to a third aspect, an embodiment of this application provides an electronic device, including a processor and a memory. The memory is configured to store one or more computer programs. When the one or more computer programs stored in the memory are executed by the processor, the electronic device is enabled to implement the method in any possible design in any one of the foregoing aspects.

According to a fourth aspect, an embodiment of this application further provides an apparatus. The apparatus includes modules/units for performing the method in any possible design in any one of the foregoing aspects. These modules/units may be implemented by hardware, or may be implemented by hardware by executing corresponding software.

According to a fifth aspect, an embodiment of this application further provides a computer-readable storage medium. The computer-readable storage medium includes a computer program. When the computer program is run on an electronic device, the electronic device is enabled to perform the method in any possible design in any one of the foregoing aspects.

According to a sixth aspect, an embodiment of this application further provides a computer program product. When the computer program product runs on a terminal, the electronic device is enabled to perform the method in any possible design in any one of the foregoing aspects.

These or other aspects of this application are more concise and easier to understand in the description of the following embodiments.

DESCRIPTION OF EMBODIMENTS

Figure 1:
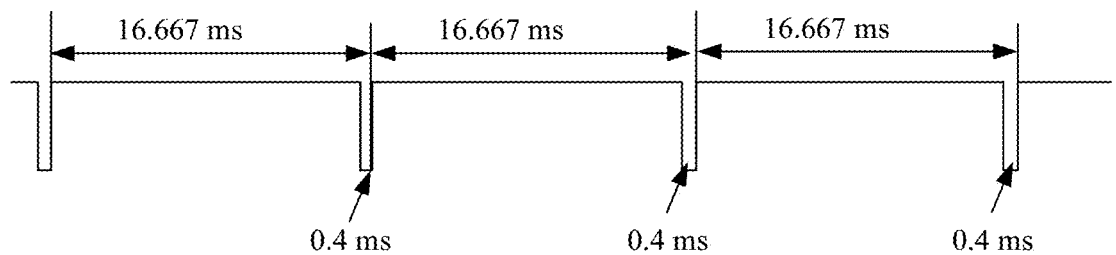
FIG. 1 is a schematic diagram of a control signal of a display screen according to an embodiment of this application.

For ease of understanding, some concepts related to the embodiments of this application are described as examples for reference.

A light sensor is usually a device that can sense light energy from ultraviolet light to infrared light and convert the light energy into an electrical signal. The light sensor is a sensing apparatus, mainly includes a photosensitive element, and is mainly classified into three types: an ambient light sensor, an infrared sensor, and an ultraviolet sensor.

The infrared sensor is also referred to as a distance sensor or a proximity sensor. The proximity sensor includes an optical transmitter and an optical receiver. The proximity sensor transmits an especially short infrared light signal by using the optical transmitter, receives a reflected infrared light signal by using the optical receiver, and measures a value of energy of the infrared light signal from being transmitted to being reflected by an object. No energy is returned when the infrared light signal is not blocked by an object, energy is returned when the infrared light signal is blocked by an object, and greater energy indicates a shorter distance. To ensure a specific signal-to-noise ratio, the proximity sensor usually transmits and receives infrared light signals for a plurality of times, and calculates a distance by using the infrared light signals transmitted and received for a plurality of times. The embodiments of this application are illustrated by using the proximity sensor as an example. It may be understood that the embodiments of this application are also applicable to another light sensor, and the proximity sensor does not constitute a limitation on the light sensor.

An image refresh frequency is a speed at which an image is updated on the screen, that is, a quantity of times that an image on the screen appears per second. For example, the image refresh frequency is usually 60 Hz, that is, 60 frames of images appear in one second, that is, a image is refreshed once every 16.67 ms (1000/60).

It should be noted that, for an organic light-emitting diode (organic light-emitting diode, OLED) screen, a smear is usually caused on the OLED screen during image refreshing. The essence of the smear is a dynamic blur caused by a high refresh rate and nearly zero response time. To avoid the smear, a drive IC of the display screen enters a control signal to the display screen. When scanning a row of pixels that need to be refreshed, the display screen first turns off and then turns on backlight of the row of pixels (that is, first turns the row of pixels black and then refreshes the row of pixels to a needed image) based on the control signal, so that no smear is caused. The control signal is used to control on/off of each row of pixels on the OLED screen.

Pulse-width modulation (pulse-width modulation, PWM) dimming is a screen brightness adjustment manner. A principle of the PWM dimming is that brightness is adjusted based on alternate on and off of a screen. In a process in which the screen is on and off, longer duration of a screen-off state indicates lower screen brightness for naked eyes. Longer on time indicates less corresponding screen-off time and the screen becomes brighter. That is, when the screen uses the PWM dimming, when the screen is on, the screen keeps on and off instead of continuously emitting light. When on and off are alternated quickly enough, naked eyes of a user feel that a mobile phone is always on. A drive IC of the display screen enters a PWM signal to the display screen, to perform PWM dimming on the display screen. The PWM signal is a signal with an adjustable duty ratio. The PWM signal is a square wave, and a ratio of high-level duration in the square wave to a refresh cycle of one frame of image is referred to as a duty ratio. A larger duty ratio indicates higher display brightness of the display screen.

Direct-current (direct-current, DC) dimming is another screen brightness adjustment manner. Specifically, a principle of the DC dimming is that brightness of a screen is changed by increasing or decreasing circuit power. Because power is equal to voltage multiplied by current, the brightness of the screen can be changed by changing either a voltage or a current.

It should be noted that when brightness of a display screen of an electronic device is greater than a threshold, the screen uses only DC dimming; or when brightness of the screen is less than or equal to the threshold, the screen uses only PWM dimming.

As described in the background, when a display screen of a full-screen mobile phone is in a screen-on state, because a proximity sensor is installed under a display area of the screen, the display area that is of the OLED display screen and that corresponds to the proximity sensor blinks because the proximity sensor emits infrared light. Specifically, the display area blinks mainly because a conventional proximity sensor periodically transmits an infrared light signal to detect whether an object approaches. If pixels corresponding to the display area are emitting light, an infrared light signal transmitted by the proximity sensor affects brightness and a color of the display area. For example, the mobile phone refreshes the OLED screen at an image refresh frequency of 60 Hz, and the screen currently uses only DC dimming. FIG. 1 shows a control signal entered by a drive IC to the display screen. Because the image refresh frequency of the OLED screen is 60 Hz, that is, one frame of image is refreshed approximately every 16.667 ms. A high-level time period of the control signal in a refresh cycle of each frame of image is a time period in which the pixels in the display area corresponding to the light sensor emit light. The high-level time period may be referred to as a display time period. A low-level time period of the control signal in the image refresh cycle is a time period in which the pixels in the display area corresponding to the light sensor do not emit light. The low-level time period may be referred to as a non-light-emitting time period. It can be learned that, in FIG. 1, the screen switches one frame of image every 16.667 ms. Every 16.667 ms includes a time period (approximately 0.4 ms) in which the pixels in the display area corresponding to the light sensor do not emit light, that is, duration corresponding to the non-light-emitting time period is 0.4 ms.

In the conventional technology, an optical transmitter may transmit an infrared light signal in the display time period, and therefore the brightness and the color of the display area change. Then, when the optical transmitter does not transmit an infrared light signal, the brightness and the color of the display area gradually recover to normal. Because the optical transmitter periodically transmits an infrared light signal, the display area periodically changes as described above, and therefore the screen blinks in the display area.

The brightness and the color of the display area do not change when the optical transmitter of the proximity sensor transmits an infrared light signal in at least a part of the non-light-emitting time period. Based on this finding, the embodiments of this application provide a light sensor status control method. The method is used to control a working status of a light sensor. That is, in at least a part of a time period in which pixels in a display area that is of an OLED display screen and that corresponds to the light sensor do not emit light, a processor controls an optical transmitter of the light sensor to transmit an optical signal; and when the pixels in the display area that is of the OLED display screen and that corresponds to the light sensor emit light, the processor controls the optical transmitter of the light sensor not to transmit an optical signal. For example, for the control signal shown in FIG. 1, the light sensor transmits an infrared light signal in at least a part of the non-light-emitting time period (approximately 0.4 ms) in the refresh cycle of each frame of image, and does not transmit an infrared light signal in a remaining part of the non-light-emitting time period. For example, in the light-emitting time period in the refresh cycle of each frame of image, the light sensor does not transmit an infrared light signal. In at least a part of the non-light-emitting time period in the refresh cycle of each frame of image, the light sensor transmits an infrared light signal. For example, the non-light-emitting time period in the refresh cycle of each frame of image is 0.4 ms, the light sensor may transmit an infrared light signal in the first 0.3 ms of the 0.4 ms, and does not transmit an infrared light signal in the remaining 0.1 ms. Alternatively, the light sensor may transmit an infrared light signal in all the 0.4 ms of the non-light-emitting time period of each frame of image. Alternatively, the light sensor may not emit infrared light in the first 0.1 ms of the 0.4 ms, not emit infrared light the last 0.1 ms of the 0.4 ms, and emit infrared light in a time period of the middle 0.2 ms of the 0.4 ms.

Figure 2A:
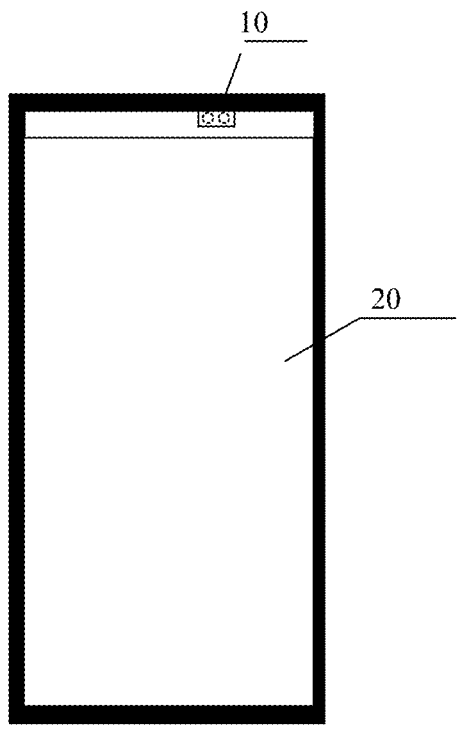
FIG. 2a and FIG. 2b are a schematic diagram of an assembly structure of a mobile phone according to an embodiment of this application.
Figure 2B:
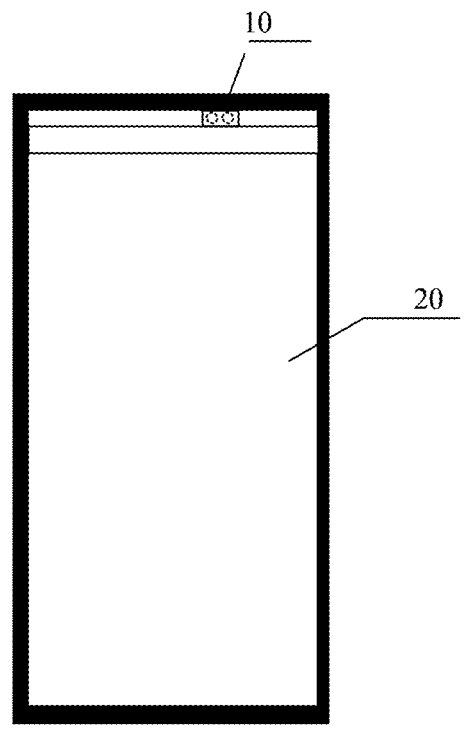

As shown in FIG. 2a and FIG. 2b, a proximity sensor 10 is located under a screen 20. In FIG. 2a, pixels in a display area that is of the OLED display screen and that corresponds to the proximity sensor 10 do not emit light. In FIG. 2b, the pixels in the display area that is of the OLED display screen and that corresponds to the proximity sensor 10 emit light. A processor predicts, in a image refresh cycle, a display time period in which the pixels in the display area that is of the OLED display screen and that corresponds to the light sensor emit light, and predicts a non-light-emitting time period in which the pixels in the display area do not emit light; and the processor instructs an optical transmitter of the proximity sensor to transmit an infrared light signal in all or a part of the non-light-emitting time period, and instructs the optical transmitter of the proximity sensor not to transmit an infrared light signal in the display time period.

The light sensor status control method provided in the embodiments of this application may be applied to an electronic device, such as a mobile phone, a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), a wearable electronic device, or a virtual reality device. This is not limited in the embodiments of this application.

Figure 3:
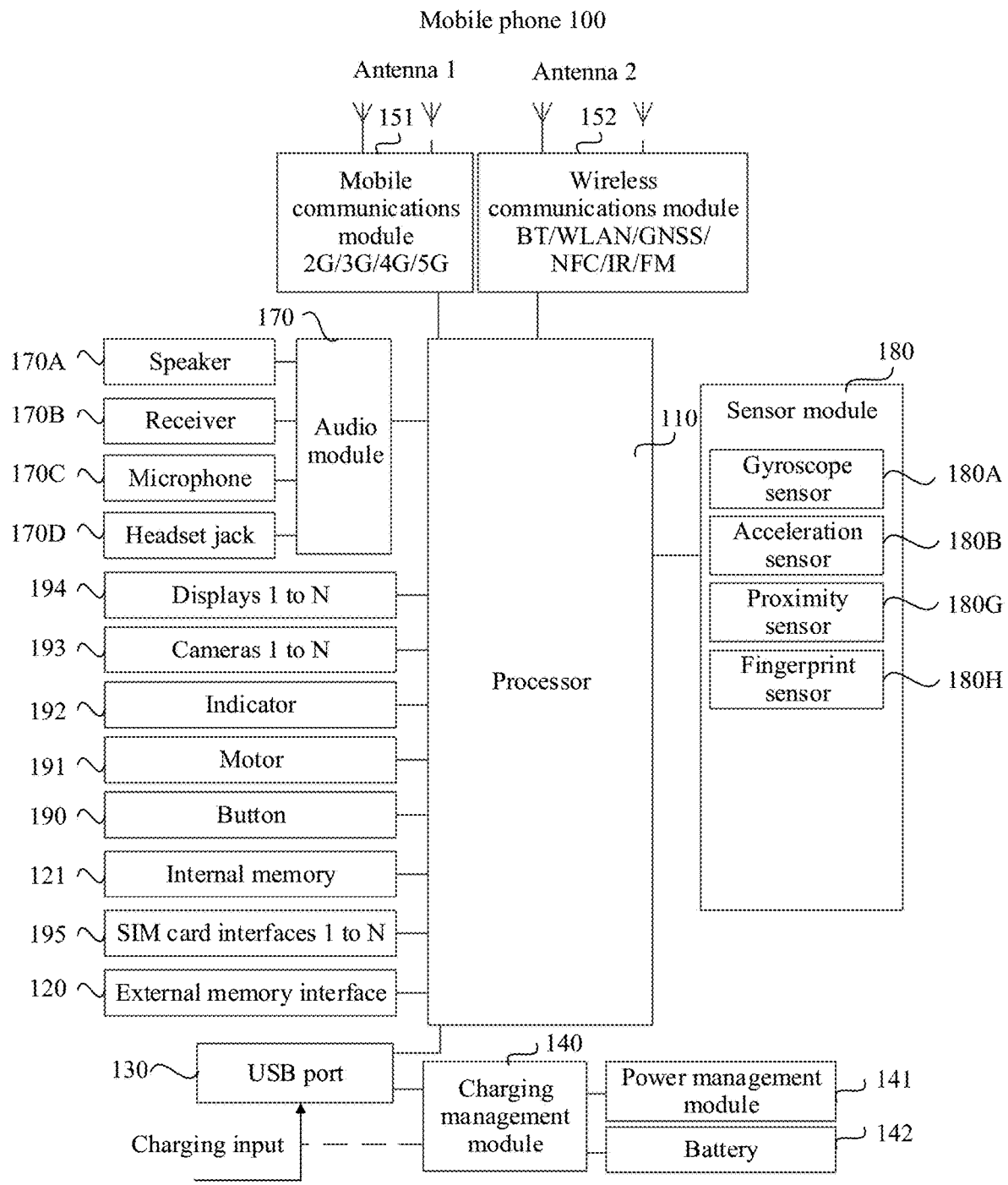
FIG. 3 is a schematic diagram of a structure of a mobile phone according to an embodiment of this application.

For example, the electronic device is a mobile phone. FIG. 3 is a schematic diagram of a structure of a mobile phone.

The mobile phone may include a processor 110, an external memory interface 120, an internal memory 121, a USB port 130, a charging management module 140, a power management module 141, a battery 142, an antenna 1, an antenna 2, a mobile communications module 151, a wireless communications module 152, an audio module 170, a speaker 170A, a receiver 170B, a microphone 170C, a headset jack 170D, a sensor module 180, a button 190, a motor 191, an indicator 192, a camera 193, a display screen 194, a SIM card interface 195, and the like. The sensor module 180 may include a gyroscope sensor 180A, an acceleration sensor 180B, a proximity sensor 180G, a fingerprint sensor 180H, and the like (certainly, the mobile phone 100 may further include another sensor, such as a touch sensor, a temperature sensor, a pressure sensor, a magnetic sensor, an ambient light sensor, a barometric pressure sensor, or a bone conduction sensor, which is not shown in the figure).

The proximity sensor 180G may include an optical transmitter and an optical receiver, the optical transmitter may be an infrared light-emitting diode, and the optical receiver is, for example, a photodiode. The mobile phone emits infrared light by using the light-emitting diode, and the mobile phone receives reflected infrared light from a near object by using the photodiode. When the photodiode receives sufficient reflected light data, the mobile phone may determine that there is an object near the mobile phone. When insufficient reflected light is detected, the mobile phone may determine that there is no object near the mobile phone.

It may be understood that the illustrated structure in the embodiments of this application does not constitute a specific limitation on the mobile phone 100. In some other embodiments of this application, the mobile phone 100 may include more or fewer components than those shown in the figure, or combine some components, or divide some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be separate devices, or may be integrated into one or more processors. The controller may be a nerve center and a command center of the mobile phone 100. The controller may generate an operation control signal based on an instruction operation code and a time sequence signal, to control obtaining of an instruction and execution of the instruction.

A memory may be further disposed in the processor 110 to store an instruction and data. In some embodiments, the memory in the processor 110 is a cache. The memory may store an instruction or data just used or cyclically used by the processor 110. If the processor 110 needs to use the instruction or the data again, the processor 110 may directly invoke the instruction or the data from the memory. This avoids repeated access and reduces a waiting time of the processor 110, thereby improving system efficiency.

The processor 110 may run the light sensor status control method provided in the embodiments of this application. In the method, the processor determines, in a image refresh cycle, a display time period in which pixels in a display area that is of the OLED display screen and that corresponds to the light sensor emit light, and predicts a non-light-emitting time period in which the pixels in the display area do not emit light; and the processor instructs the optical transmitter of the proximity sensor to transmit an infrared light signal in at least a part of the non-light-emitting time period, and instructs the optical transmitter of the proximity sensor not to transmit an infrared light signal in the display time period. When different components are integrated into the processor 110, for example, a CPU and a GPU are integrated, the CPU and the GPU may cooperate to perform the method provided in the embodiments of this application. For example, in the method, some algorithms are performed by the CPU, and the other algorithms are performed by the GPU, to obtain relatively fast processing efficiency.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini LED, a micro LED, a micro OLED, a quantum dot light-emitting diode (quantum dot light-emitting diode, QLED), or the like. In some embodiments, the mobile phone 100 may include one or N displays 194, where N is a positive integer greater than 1. In this embodiment of this application, the proximity sensor 180G is disposed under the display panel. In addition, a drive IC is further disposed on the display, and the drive IC is configured to drive the display, control a drive current, and the like. The drive IC generates a display synchronization signal, where the display synchronization signal may be a image tearing effect (tearing effect, TE) signal or a frame synchronization signal, and the drive IC generates a control signal or a pulse-width modulation signal.

The camera 193 (a front camera or a rear camera) is configured to capture a static image or a video. Generally, the lens 193 may include a photosensitive element such as a lens group and an image sensor. The lens group includes a plurality of optical lenses (concave lenses or convex lenses), configured to collect an optical signal reflected by a to-be-photographed object and transmit the collected optical signal to the image sensor. The image sensor generates an original image of the to-be-photographed object based on the optical signal.

The internal memory 121 may be configured to store computer-executable program code, and the executable program code includes an instruction. The processor 110 runs the instruction stored in the internal memory 121, to implement various function applications and data processing of the mobile phone 100. The internal memory 121 may include a program storage area and a data storage area. The program storage area may store an operating system, code of an application (for example, a camera application or a WeChat application), and the like. The data storage area may store data (for example, an image, a video, or a phonebook collected by the camera application) created during use of the mobile phone 100 and the like.

In addition, the internal memory 121 may include a high-speed random access memory, or may include a non-volatile memory, for example, at least one magnetic disk storage device, a flash storage device, or a universal flash storage (universal flash storage, UFS).

For example, the display screen 194 of the mobile phone 100 displays a home screen, and the home screen includes icons of a plurality of applications (for example, a camera application and a WeChat application). The user taps an icon of the camera application on the home screen by using the touch sensor 180K, to trigger the processor 110 to start the camera application and turn on the camera 193. The display screen 194 displays an interface of the camera application, for example, the viewfinder interface.

A wireless communication function of the mobile phone 100 may be implemented through the antenna 1, the antenna 2, the mobile communications module 151, the wireless communications module 152, the modem processor, the baseband processor, and the like.

The antenna 1 and the antenna 2 are configured to transmit and receive electromagnetic wave signals. Each antenna in the mobile phone 100 may be configured to cover one or more communication bands. Different antennas may be multiplexed to improve antenna utilization. For example, the antenna 1 may be multiplexed as a diversity antenna of a wireless local area network. In some other embodiments, an antenna may be used in combination with a tuning switch.

The mobile communications module 151 may provide a solution, applied to the mobile phone 100, to wireless communication including 2G, 3G, 4G, 5G, and the like. The mobile communications module 151 may include at least one filter, a switch, a power amplifier, a low noise amplifier (low noise amplifier, LNA), and the like. The mobile communications module 151 may receive an electromagnetic wave through the antenna 1, perform processing such as filtering or amplification on the received electromagnetic wave, and transmit a processed electromagnetic wave to the modem processor for demodulation. The mobile communications module 151 may further amplify a signal modulated by the modem processor, and convert the signal into an electromagnetic wave for radiation through the antenna 1. In some embodiments, at least some function modules of the mobile communications module 151 may be disposed in the processor 110. In some embodiments, at least some function modules of the mobile communications module 151 and at least some modules of the processor 110 may be disposed in a same device.

The modem processor may include a modulator and a demodulator. The modulator is configured to modulate a to-be-sent low-frequency baseband signal into an intermediate- or high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is processed by the baseband processor, and a processed signal is transmitted to the application processor. The application processor outputs a sound signal by using an audio device (not limited to the speaker 170A, the receiver 170B, and the like), or displays an image or a video by using the display screen 194. In some embodiments, the modem processor may be an independent device. In some other embodiments, the modem processor may be independent of the processor 110, and is disposed in the same device as the mobile communications module 151 or another function module.

The wireless communications module 152 may provide a solution, applied to the mobile phone 100, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communications module 152 may be one or more devices integrating at least one communications processing module. The wireless communications module 152 receives an electromagnetic wave through the antenna 2, performs frequency modulation and filtering processing on an electromagnetic wave signal, and sends a processed signal to the processor 110. The wireless communications module 152 may further receive a to-be-sent signal from the processor 110, perform frequency modulation and amplification on the signal, and convert the signal into an electromagnetic wave for radiation through the antenna 2.

In addition, the mobile phone 100 may implement an audio function, for example, music playing and recording, by using the audio module 170, the speaker 170A, the receiver 170B, the microphone 170C, the headset jack 170D, the application processor, and the like. The mobile phone 100 may receive input of the button 190, and generate button signal input related to user setting and function control of the mobile phone 100. The mobile phone 100 may generate a vibration alert (for example, a calling vibration alert) by using the motor 191. The indicator 192 of the mobile phone 100 may be an indicator light, may be configured to indicate a charging state and a battery level change, and may be further configured to indicate a message, a missed call, a notification, and the like. The SIM card interface 195 of the mobile phone 100 is configured to connect to a SIM card. The SIM card may be inserted into the SIM card interface 195 or plugged from the SIM card interface 195, to implement contact with or separation from the mobile phone 100.

It should be understood that, in actual application, the mobile phone 100 may include more or fewer components than those shown in FIG. 1. This is not limited in this embodiment of this application.

Figure 4:
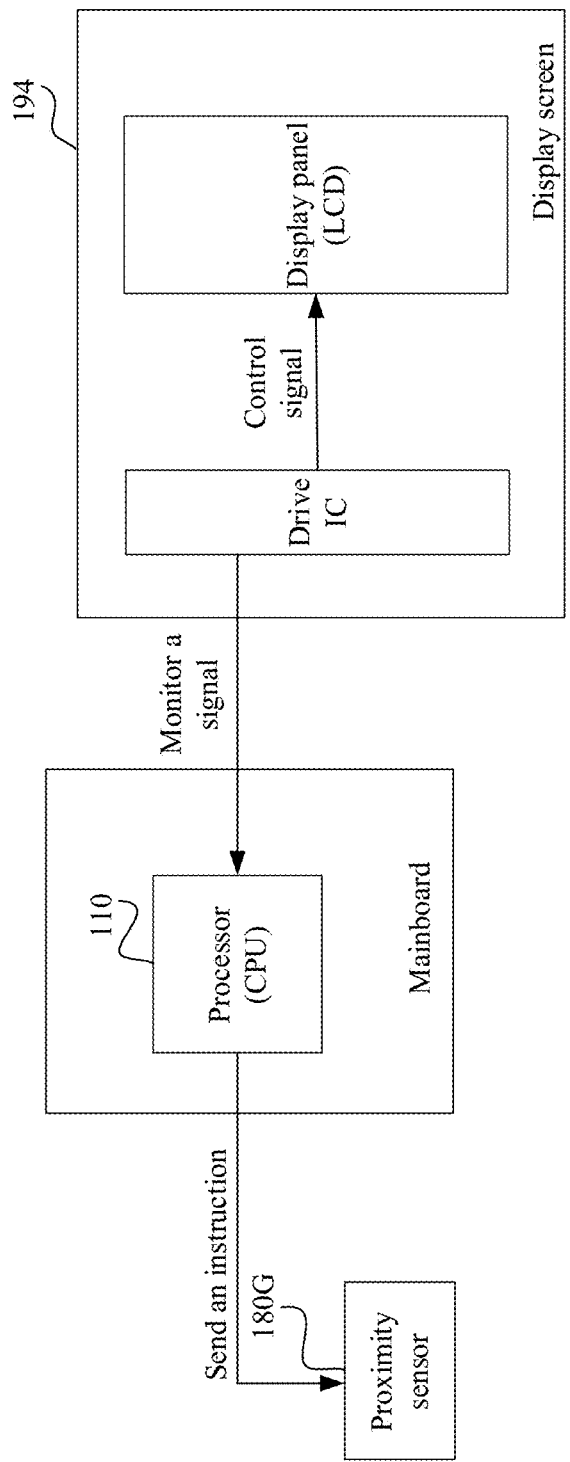
FIG. 4 is a schematic diagram of a structure of another mobile phone according to an embodiment of this application.

Referring to FIG. 4, in an embodiment of this application, a drive IC sends a control signal or a pulse-width modulation signal to a display panel, and a processor 110 is connected to the drive IC of the display panel. In an embodiment, the processor 110 monitors a display synchronization signal of the drive IC. When the processor obtains a display synchronization signal through monitoring, it indicates that the display panel just completes image refreshing. Therefore, the processor predicts a non-light-emitting time period and a display time period in a image refresh cycle based on a image refresh frequency and a frequency of the pulse-width modulation signal, and sends a control instruction to a proximity sensor 180G. The control instruction is used to instruct the proximity sensor 180G to transmit an infrared light signal in all or a part of the non-light-emitting time period, and not transmit an infrared light signal in the display time period. In an embodiment, the processor 110 monitors the control signal or the pulse-width modulation signal of the drive IC. The processor determines that a high-level time period of the signal is a display time period and a low-level time period of the signal is a non-light-emitting time period. Therefore, the processor sends a control instruction to a proximity sensor 180G. The control instruction is used to instruct the proximity sensor 180G to transmit an infrared light signal in all or a part of the non-light-emitting time period, and not transmit an infrared light signal in the display time period.

Figure 5:
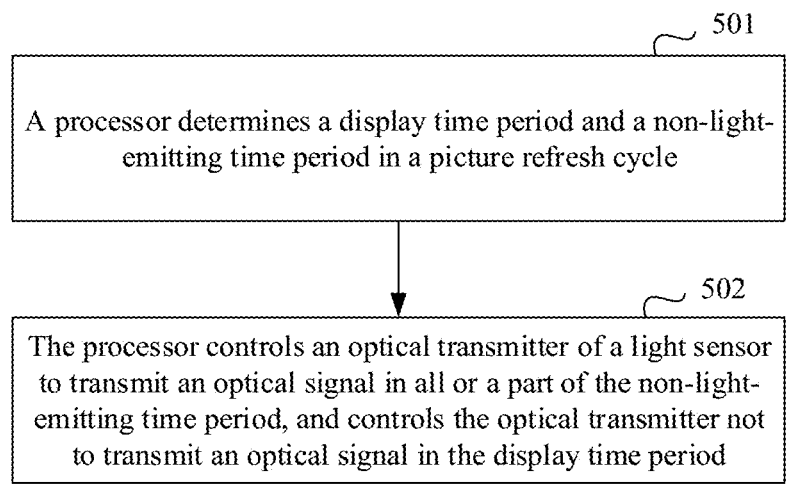
FIG. 5 is a schematic diagram of a sensor status control method according to an embodiment of this application.

Based on the hardware structures shown in FIG. 3 and FIG. 4, an embodiment of this application provides a light sensor status control method. Referring to a procedure shown in FIG. 5, the method is performed by a processor of an electronic device, and the method includes the following steps:

Step 501: The processor determines a display time period and a non-light-emitting time period in a image refresh cycle.

A display screen of the electronic device is in a screen-on state, the display time period is a time period in which pixels in a display area that is of the OLED display screen and that corresponds to a light sensor emit light, and the non-light-emitting time period is a time period in which the pixels in the display area that is of the OLED display screen and that corresponds to the light sensor do not emit light.

Step 502: When the light sensor is in a working mode, the processor controls an optical transmitter of the light sensor to transmit an optical signal in all or a part of the non-light-emitting time period, and controls the optical transmitter not to transmit an optical signal in the display time period.

For example, the electronic device is a mobile phone, and the light sensor is a proximity sensor disposed under a screen of the mobile phone. When an application currently run by the electronic device is a phone application, and the phone application is in a call state or an outgoing call state, the proximity sensor of the electronic device is started and is in a working mode. In another possible case, if an application currently run by the electronic device is an application other than the phone application, such as a WeChat® application, the proximity sensor of the electronic device is not started and is in a sleep mode, and an optical transmitter does not transmit an optical signal.

The following continues to use the example in which the electronic device is a mobile phone, and the light sensor is a proximity sensor disposed under a screen of the mobile phone, to show the following three implementations of controlling a status of the proximity sensor.

Implementation 1

The mobile phone may monitor a control signal or a pulse-width modulation signal of a drive IC of a display 194. When determining, through monitoring, that the control signal or the pulse-width modulation signal is switched to a low level, a processor of the mobile phone instructs an optical transmitter of the proximity sensor to transmit an infrared light signal; and when determining, through monitoring, that the control signal or the pulse-width modulation signal is switched to a high level, the processor of the mobile phone instructs the optical transmitter of the proximity sensor not to transmit an infrared light signal.

For example, for a square wave of the control signal shown in FIG. 1, when determining, through monitoring, that the square wave is at a low level, the mobile phone instructs the optical transmitter of the proximity sensor to transmit an infrared light signal; or when determining, through monitoring, that the square wave is at a high level, the mobile phone instructs the optical transmitter of the proximity sensor not to transmit an infrared light signal.

Implementation 2

A visible light sensor may be disposed adjacent to the proximity sensor. When pixels in a display area that is of the OLED display screen and that corresponds to the visible light sensor emit light, the visible light sensor can obtain visible light through monitoring, that is, obtain the display time period in the image refresh cycle through monitoring, and then instruct an optical transmitter of the proximity sensor not to transmit an infrared light signal. When the pixels in the display area that is of the OLED display screen and that corresponds to the visible light sensor do not emit light, the visible light sensor cannot obtain visible light through monitoring, that is, obtain the non-light-emitting time period in the image refresh cycle through monitoring, and then instruct the optical transmitter of the proximity sensor to transmit an infrared light signal in at least a part of the non-light-emitting time period in the image refresh cycle.

Implementation 3

The mobile phone may monitor a display synchronization signal of a drive IC of a display screen 194. When a processor obtains a display synchronization signal through monitoring, it indicates that the display screen just completes refreshing of one frame of image. Therefore, the processor determines a non-light-emitting time period and a display time period in a next image refresh cycle, and instructs an optical transmitter of the proximity sensor to transmit an optical signal only in at least a part of the non-light-emitting time period in the next image refresh cycle.

It should be noted that the display screen of the mobile phone uses PWM dimming only when brightness of the display screen is less than or equal to a specified brightness value. If brightness of the display screen is greater than the specified brightness value, the display screen uses DC dimming instead of the PWM dimming. Therefore, this embodiment of this application separately provides descriptions in the following two scenarios.

Scenario 1

Figure 6:
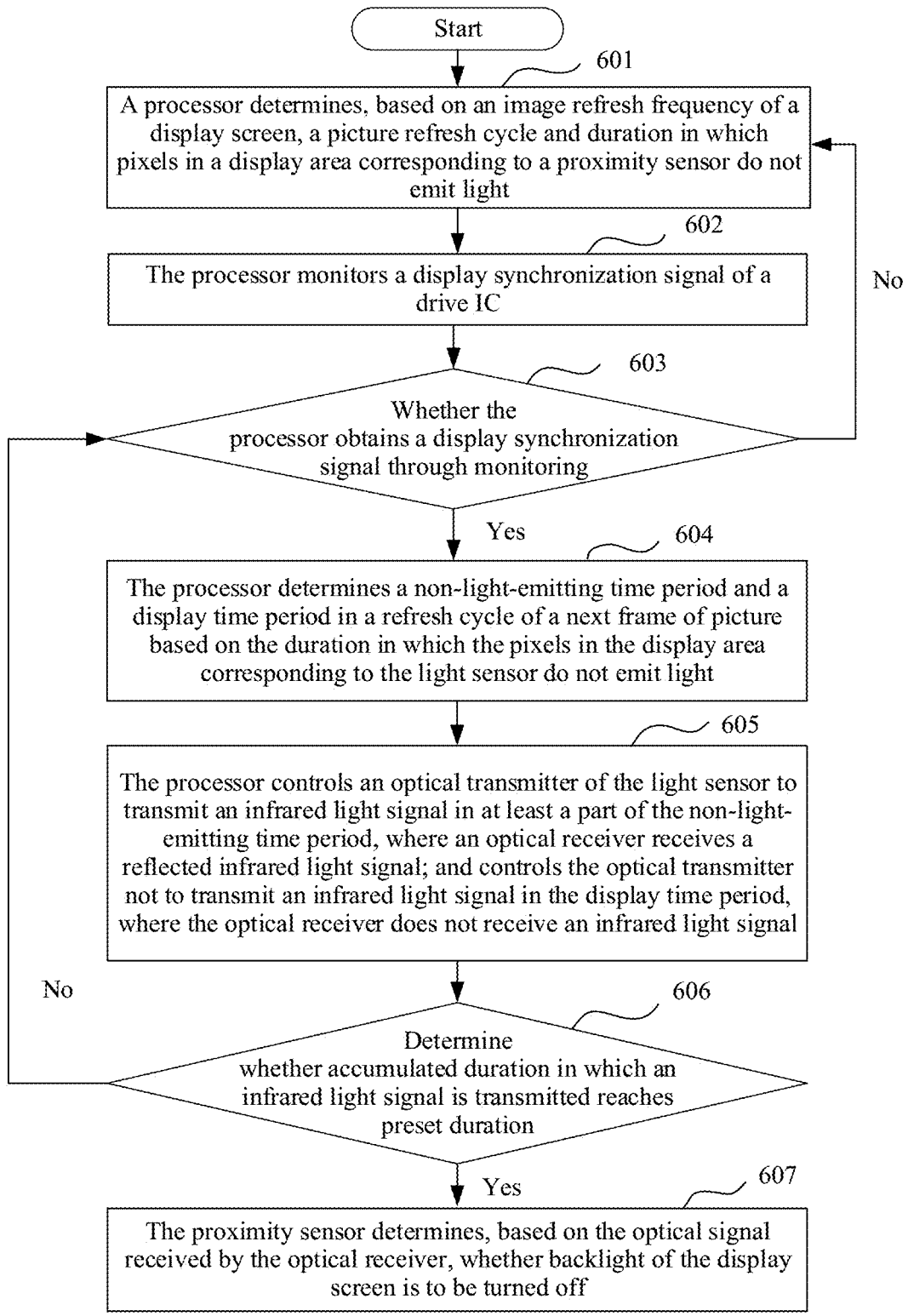
FIG. 6 is a schematic diagram of another sensor status control method according to an embodiment of this application.

When the processor determines that current brightness of the display screen of the mobile phone is greater than the specified brightness value, the processor controls the status of the proximity sensor based on a method procedure shown in FIG. 6. Specific steps are as follows:

Step 601: The processor determines, based on an image refresh frequency, a refresh cycle of each frame of image and duration in which the pixels in the display area that is of the OLED display screen and that corresponds to the light sensor do not emit light.

For example, when the image refresh frequency is 60 Hz, the refresh cycle $T_1$ of each frame of image is 16.667 ms, and the duration $T_2$ in which the pixels in the display area that is of the OLED display screen and that corresponds to the light sensor do not emit light is 0.4 ms.

Step 602: The processor monitors a display synchronization signal of the drive IC.

Step 603: The processor determines whether the processor obtains a display synchronization signal through monitoring; and if the processor obtains no display synchronization signal through monitoring, returns to and performs step 602; or if the processor obtains a display synchronization signal through monitoring, performs step 604.

Step 604: Assuming that the processor obtains a display synchronization signal through monitoring at a first moment, the processor determines a non-light-emitting time period and a display time period in a refresh cycle of a next frame of image based on the duration in which the pixels in the display area that is of the OLED display screen and that corresponds to the light sensor do not emit light.

For example, if the processor obtains a display synchronization signal through monitoring at a moment t1, the processor determines, based on the duration of 0.4 ms in which the pixels in the display area that is of the OLED display screen and that corresponds to the light sensor do not emit light, that the display time period in the refresh cycle of the next frame of image is (t1, t1+16.267 ms) and the non-light-emitting time period in the refresh cycle of the next frame of image is (t1+16.267 ms, t1+16.667 ms).

Step 605: The processor controls the optical transmitter of the light sensor to transmit an infrared light signal in at least a part of the non-light-emitting time period, where an optical receiver receives a reflected infrared light signal; and controls the optical transmitter not to transmit an infrared light signal in the display time period, where the optical receiver does not receive an infrared light signal.

For example, the processor controls the optical transmitter of the light sensor to transmit an infrared light signal in at least a part of the non-light-emitting time period (t1+16.267 ms, t1+16.667 ms), and not transmit an infrared light signal in the display time period (t1, t1+16.267 ms). Duration in which the optical transmitter transmits an infrared light signal each time is less than or equal to the duration in which the pixels in the display area that is of the OLED display screen and that corresponds to the light sensor do not emit light. For example, the duration in which an infrared light signal is transmitted each time is 250 µs. It should be noted that the light sensor does not transmit infrared light signals every refresh cycle. In other words, the light sensor may transmit infrared light signals in a part of a non-light-emitting time period in a part of refresh cycles.

Step 606: The processor determines whether accumulated duration in which the optical transmitter transmits an infrared light signal reaches preset duration; and if yes, performs step 607; or if no, performs step 603.

To ensure a signal-to-noise ratio, assuming that the preset duration in which the proximity sensor needs to transmit an infrared light signal is 1 ms, the processor determines that accumulated duration of 250 µs in which an infrared light signal is transmitted in the image refresh cycle is less than 1 ms, and therefore returns to and performs step 603 until the accumulated duration reaches 1 ms.

Step 607: The proximity sensor determines, based on the optical signal received by the optical receiver, whether backlight of the display screen is to be turned off.

That is, when determining, based on an energy value of the reflected optical signal, that currently an object approaches the proximity sensor, the proximity sensor generates an interrupt signal, and the processor receives the interrupt signal and instructs the drive IC of the display screen to disconnect a backlight power supply control pin. If it is determined that no object approaches, the display screen continues image refreshing.

Figure 7A:
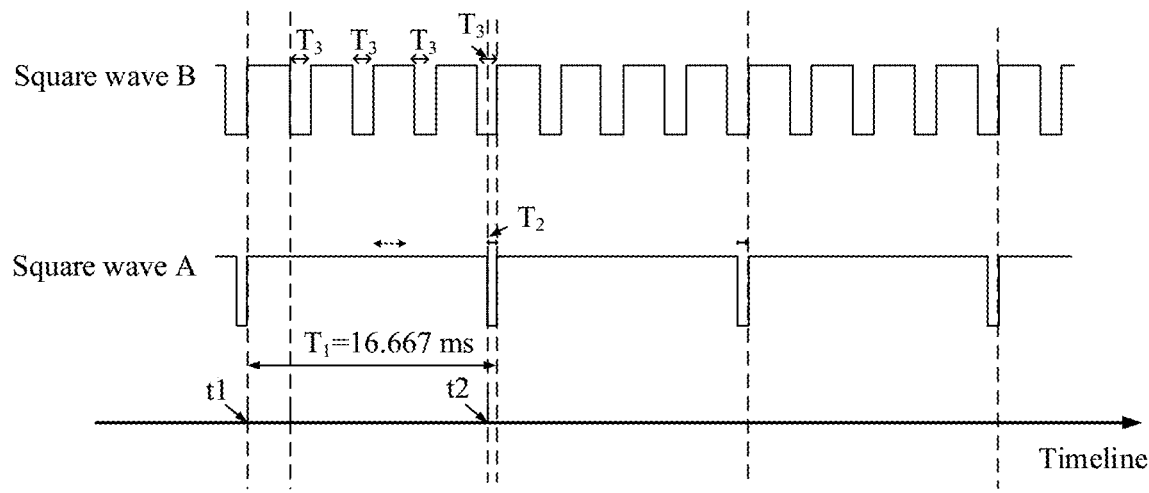
FIG. 7a and FIG. 7b are a schematic diagram of a square wave and image refreshing according to an embodiment of this application.
Figure 7B:
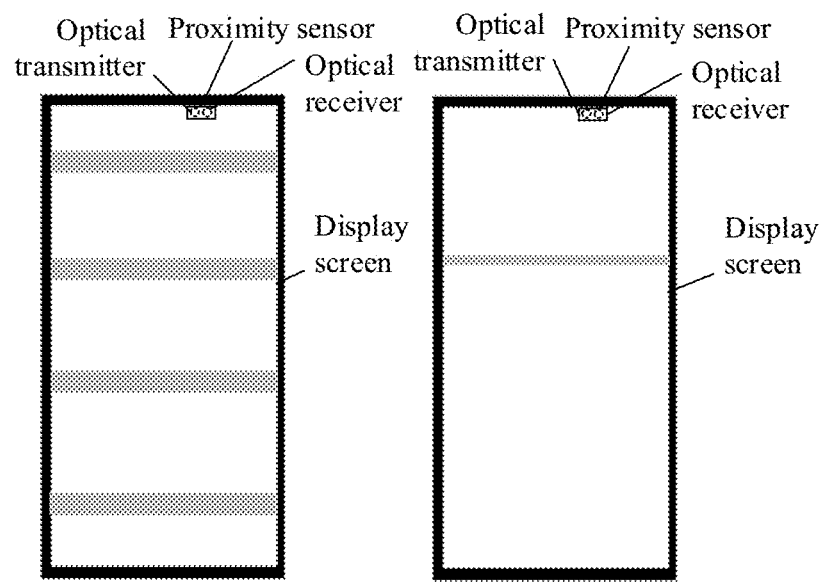

For example, a square wave A in FIG. 7a and FIG. 7b shows a control signal entered by the drive IC to a display panel when the brightness of the display screen of the mobile phone is greater than the specified brightness value. It is assumed that the image refresh frequency of the display screen is 60 Hz (it should be noted that, the image refresh frequency is not exactly 60 Hz, but fluctuates around 60 Hz due to a factor, such as a temperature). The processor determines, through calculation based on the image refresh frequency of 60 Hz of the display screen, that the refresh cycle $T_1$ of each frame of image is approximately 16.667 ms, and the duration $T_2$ in which the pixels in the display area that is of the OLED display screen and that corresponds to the light sensor do not emit light is 0.4 ms. If the processor obtains a display synchronization signal through monitoring at a moment t1, the processor instructs the proximity sensor to start transmitting an infrared light signal after a delay of $T_1$-$T_2$ duration (approximately 16.267 ms) from the moment t1, that is, at a moment t2. The duration in which an infrared light signal is transmitted each time is less than or equal to $T_2$. For example, the duration in which an infrared light signal is transmitted each time is 250 µs. Because accumulated duration of 250 µs in which the optical transmitter transmits an infrared light signal at this time is less than the preset duration of 1 ms, the processor repeatedly performs the foregoing steps after obtaining a display synchronization signal through monitoring at a next time, until the accumulated duration reaches the preset duration of 1 ms. Further, when the accumulated duration reaches the preset duration of 1 ms, the processor may control the optical transmitter to stop transmitting an infrared light signal in a subsequent non-light-emitting time period. That is, the processor may control the optical transmitter to transmit an infrared light signal in all or a part of the non-light-emitting time period in the image refresh cycle. The processor may control the optical transmitter to transmit an infrared light signal in all or some non-light-emitting time periods in some image refresh cycles. That is, it is possible that the optical transmitter transmits no infrared light signal in all non-light-emitting time periods of some image refresh cycles.

In a possible implementation, the optical transmitter of the light sensor transmits an infrared light signal in a first non-light-emitting time period in a first image refresh cycle. The optical transmitter of the light sensor does not transmit an infrared light signal in a second non-light-emitting time period in the first image refresh cycle. A non-light-emitting time period in the first image refresh cycle includes the first non-light-emitting time period and the second non-light-emitting time period. The optical transmitter of the light sensor transmits infrared light signals in all non-light-emitting time periods in a second image refresh cycle. The optical transmitter of the light sensor transmits no infrared light signal in all non-light-emitting time periods in a third image refresh cycle.

The optical transmitter of the light sensor transmits no infrared light signal in all of the light-emitting time period in the image refresh cycle.

It should be noted that after determining the non-light-emitting time period in the refresh cycle of the next frame of image, the processor may instruct the proximity sensor to transmit an infrared light signal in all or a part of the non-light-emitting time period. For example, the processor controls the optical transmitter of the light sensor to transmit an infrared light signal in a non-light-emitting time period (t1+16.367 ms, t1+16.667 ms), and the duration in which an infrared light signal is transmitted each time is 250 µs.

Scenario 2

Figure 8:
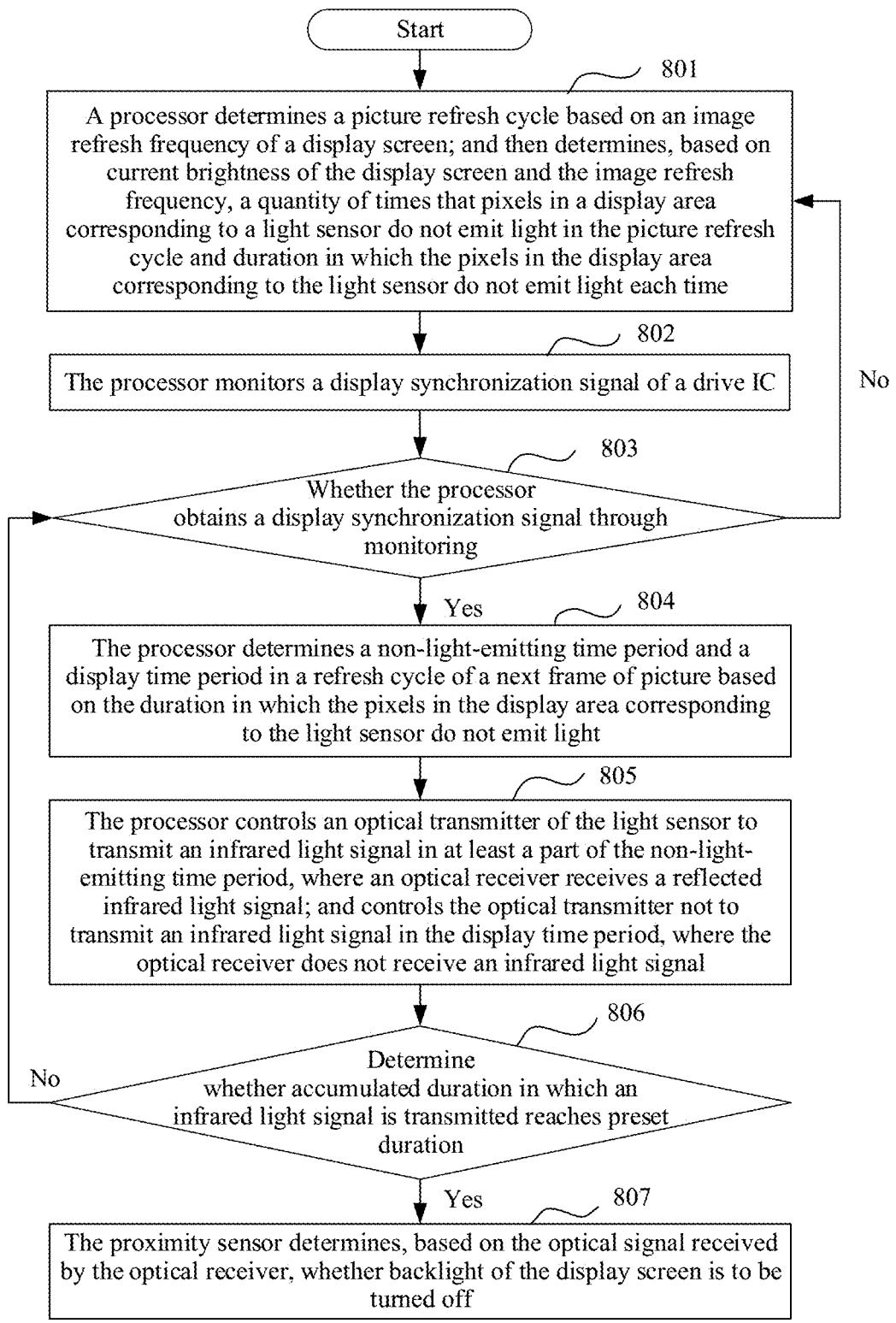
FIG. 8 is a schematic diagram of another sensor status control method according to an embodiment of this application.

When the processor determines that current brightness of the display screen of the mobile phone is less than or equal to the specified brightness value, it indicates that PWM dimming is performed on the display screen, that is, a pulse-width modulation signal exists. The processor controls the status of the proximity sensor based on a method procedure shown in FIG. 8. Specific steps are as follows:

Step 801: The processor determines the image refresh cycle based on an image refresh frequency of the display screen; and then determines, based on the current brightness of the display screen and the image refresh frequency, a quantity of times that the pixels in the display area that is of the OLED display screen and that corresponds to the light sensor do not emit light in the image refresh cycle and duration in which the pixels in the display area that is of the OLED display screen and that corresponds to the light sensor do not emit light each time.

Specifically, the processor may determine a frequency of the pulse-width modulation signal based on a gray scale value of the current brightness of the display screen; and then the processor determines a refresh cycle of each frame of image based on the image refresh frequency, and determines, based on the frequency of the pulse-width modulation signal and the image refresh frequency, a quantity of times that the pixels in the display area that is of the OLED display screen and that corresponds to the light sensor do not emit light in the refresh cycle of each frame of image and duration in which the pixels in the display area that is of the OLED display screen and that corresponds to the light sensor do not emit light each time.

For example, when it is determined, based on the gray scale value of the current brightness, that the frequency of the pulse-width modulation signal is 240 Hz, and the image refresh frequency is 60 Hz, the refresh cycle $T_1$ of each frame of image is 16.667 ms, the pixels in the display area that is of the OLED display screen and that corresponds to the light sensor do not emit light for four times in the refresh cycle of each frame of image, the duration $T_3$ in which the pixels in the display area that is of the OLED display screen and that corresponds to the light sensor do not emit light each time is 0.8 ms, and a time period corresponding to each $T_3$ is considered as one non-light-emitting time period.

Step 802: The processor monitors a display synchronization signal of the drive IC.

Step 803: The processor determines whether the processor obtains a display synchronization signal through monitoring; and if the processor obtains no display synchronization signal through monitoring, returns to and performs step 802; or if the processor obtains a display synchronization signal through monitoring, performs step 804.

Step 804: Assuming that the processor obtains a display synchronization signal through monitoring at a first moment, the processor determines a non-light-emitting time period and a display time period in a refresh cycle of a next frame of image based on the duration in which the pixels in the display area that is of the OLED display screen and that corresponds to the light sensor do not emit light.

For example, if the processor obtains a display synchronization signal through monitoring at a moment t1, the processor determines, based on the duration of 0.8 ms in which the pixels in the display area that is of the OLED display screen and that corresponds to the light sensor do not emit light and the quantity 4 of non-light-emitting times, that non-light-emitting time periods in the refresh cycle of the next frame of image are (t1+$T_1$/4−0.8, t1+$T_1$/4), (t1+$T_1$/2−0.8, t1+$T_1$/2), (t1+3$T_1$/4−0.8, t1+3$T_1$/4), and (t1+$T_1$−0.8, t1+$T_1$), and remaining time periods are display time periods.

Step 805: The processor controls the optical transmitter of the light sensor to transmit an infrared light signal in at least a part of the non-light-emitting time period, where an optical receiver receives a reflected infrared light signal; and controls the optical transmitter not to transmit an infrared light signal in the display time period, where the optical receiver does not receive an infrared light signal.

For example, the processor controls the optical transmitter of the light sensor to transmit an infrared light signal in the non-light-emitting time period (t1+$T_1$/4−0.8, t1+$T_1$/4). Duration in which the optical transmitter transmits an infrared light signal each time is less than or equal to the duration in which the pixels in the display area corresponding to the light sensor do not emit light. For example, the duration in which an infrared light signal is transmitted each time is 250 μs.

Step 806: The processor determines whether accumulated duration in which the optical transmitter transmits an infrared light signal reaches preset duration; and if yes, performs step 807; or if no, performs step 803.

To ensure a signal-to-noise ratio, assuming that the preset duration in which the proximity sensor needs to transmit an infrared light signal is 1 ms, the processor determines that accumulated duration of 250 μs in which an infrared light signal is transmitted in the non-light-emitting time period (t1+$T_1$/4−0.8, t1+$T_1$/4) is less than 1 ms, and therefore continues to transmit infrared light signals in the non-light-emitting time periods (t1+$T_1$/2−0.8, t1+$T_1$/2), (t1+3$T_1$/4−0.8, t1+3$T_1$/4), and (t1+$T_1$−0.8, t1+$T_1$) until the accumulated duration reaches 1 ms.

Step 807: The proximity sensor determines, based on the optical signal received by the optical receiver, whether backlight of the display screen is to be turned off.

That is, when determining, based on an energy value of the reflected optical signal, that currently an object approaches the proximity sensor, the proximity sensor generates an interrupt signal, and the processor receives the interrupt signal and instructs the drive IC of the display screen to disconnect a backlight power supply control pin. If it is determined that no object approaches, the display screen continues image refreshing.

For example, a square wave B in FIG. 7*a* and FIG. 7*b* shows a pulse-width modulation signal entered by the drive IC to a display panel when the brightness of the display screen of the mobile phone is greater than the specified brightness value. It is assumed that a frequency of the pulse-width modulation signal is 240 Hz, and the image refresh frequency of the display screen is 60 Hz (it should be noted that, similarly, the frequency of 240 Hz of the pulse-width modulation signal is not exactly 240 Hz, but fluctuates around 240 Hz due to a factor, such as a temperature). The processor determines, through calculation based on the image refresh frequency of 60 Hz of the display screen, that the refresh cycle $T_1$ of each frame of image is approximately 16.667 ms, and determines, through calculation based on the frequency of 240 Hz of the pulse-width modulation signal, that the duration $T_3$ in which the pixels in the display area that is of the OLED display screen and that corresponds to the light sensor do not emit light is 0.8 ms, and the quantity of non-light-emitting times is 4. If the processor obtains a display synchronization signal through monitoring at a moment t1, the processor instructs the proximity sensor to transmit an infrared light signal in the non-light-emitting time period (t1+$T_1$/4−0.8, t1+$T_1$/4). The duration in which an infrared light signal is transmitted each time is less than or equal to $T_3$. For example, the duration in which an infrared light signal is transmitted each time is 250 μs. Because accumulated duration of 250 μs in which the optical transmitter transmits an infrared light signal at this time is less than the preset duration of 1 ms, infrared light signals continue to be transmitted in the non-light-emitting time periods (t1+$T_1$/2−0.8, t1+$T_1$/2), (t1+3$T_1$/4−0.8, t1+3$T_1$/4), and (t1+$T_1$−0.8, t1+$T_1$) until the accumulated duration reaches 1 ms.

It should be noted that after determining the non-light-emitting time period in the refresh cycle of the next frame of image, the processor may instruct the proximity sensor to transmit an infrared light signal in all or a part of the non-light-emitting time period. For example, the processor instructs the proximity sensor to transmit an infrared light signal in a non-light-emitting time period (t1+$T_1$/4−0.4, t1+$T_1$/4), and the duration in which an infrared light signal is transmitted each time may be 250 μs. Because accumulated duration of 250 µs in which the optical transmitter transmits an infrared light signal at this time is less than the preset duration of 1 ms, infrared light signals continue to be transmitted in non-light-emitting time periods ($t1+T_1/2-0.4$, $t1+T_1/2$), ($t1+3T_1/4-0.4$, $t1+3T_1/4$), and ($t1+T_1-0.4$, $t1+T_1$) until the accumulated duration reaches 1 ms.

Optionally, after step 807 or step 607 is performed, if the proximity sensor determines, based on the optical signal received by the optical receiver, that the backlight of the display screen is to be turned off, when the display screen is in a screen-off state, the proximity sensor transmits an infrared light signal and receives a reflected infrared light signal based on a fixed cycle.

Referring to FIG. 7a and FIG. 7b, if a control signal entered by the drive IC of the mobile phone to the display panel is the square wave A, one black bar box shown in FIG. 7b appears on the display screen of the mobile phone at an instant moment (a width of the black bar box is related to the duration in which the pixels in the display area that is of the OLED display screen and that corresponds to the light sensor do not emit light, and the black bar box represents that pixels of these rows do not emit light. Due to a very fast refresh frequency, the black bar box is almost invisible to naked eyes of a user in a refresh process). Because the OLED screen is refreshed from top to bottom, the black bar box appears at each row of pixels from top to bottom. When the black bar box is located in the display area corresponding to the proximity sensor, the optical transmitter works; or when the black bar box is not located in the display area that is of the OLED display screen and that corresponds to the proximity sensor, the optical transmitter does not work. If a pulse-width modulation signal entered by the drive IC of the mobile phone to the display panel is the square wave B, four black bar boxes shown in FIG. 7a appear on the display screen of the mobile phone at an instant moment. When the black bar boxes are located in the display area that is of the OLED display screen and that corresponds to the proximity sensor, the optical transmitter works; or when the black bar box is not located in the display area that is of the OLED display screen and that corresponds to the proximity sensor, the optical transmitter does not work.

For example, for a scenario in which a user picks up a mobile phone to answer a call, in an embodiment of this application, with reference to the foregoing light sensor status control method, a status of a display screen is controlled according to the following several stages.

In a first stage, when the mobile phone is in an incoming call state, the screen is on. In this case, a processor instructs, according to the foregoing method, a proximity sensor to transmit an infrared signal in a part of a time period in which pixels in a corresponding display area of the OLED display screen do not emit light. When determining, based on enough received light data, that an object approaches, the proximity sensor generates an interrupt signal. The interrupt signal instructs the processor to turn off backlight of the display screen. The processor sends a backlight turning-off instruction to a drive IC based on the interrupt signal. The drive IC disconnects a control pin connected to a power supply on the display panel.

In a second stage, when the user puts the mobile phone to an ear to make a call (in an answering process), the proximity sensor transmits an infrared light signal and receives an infrared light signal based on a fixed cycle. Therefore, the proximity sensor determines, based on received light data, that an object always approaches or gets away, and therefore the proximity sensor is always in an interrupted state.

In a third stage, when the user completes the call and takes the mobile phone away from the ear (in a process of cutting off the call), the proximity sensor first transmits an infrared light signal and receives an infrared light signal based on the fixed cycle. Therefore, when determining, based on received light data, that an object gets away, the proximity sensor sends a non-interrupt signal to the processor to instruct the processor to turn on the backlight of the display screen. The processor sends, based on the non-interrupt signal, a backlight turning-on instruction to the drive IC. The drive IC connects the control pin connected to the power supply on the display panel.

In conclusion, the electronic device performs infrared transmission and receiving in the time period in which the display area that is of the OLED display screen and that corresponds to the light sensor does not emit light, and accumulates infrared light received for a plurality of times, to determine whether an object approaches or gets away, thereby ensuring a signal-to-noise ratio of the proximity sensor, and also resolving a problem that the display area blinks due to the light sensor in the conventional technology.

An embodiment of this application further provides a computer-readable storage medium. The computer-readable storage medium includes a computer program, and when the computer program runs on an electronic device, the electronic device is enabled to perform any possible implementation of the foregoing light sensor status control method.

An embodiment of this application further provides a computer program product. When the computer program product runs on an electronic device, the electronic device is enabled to perform any possible implementation of the foregoing light sensor status control method.

Figure 9:
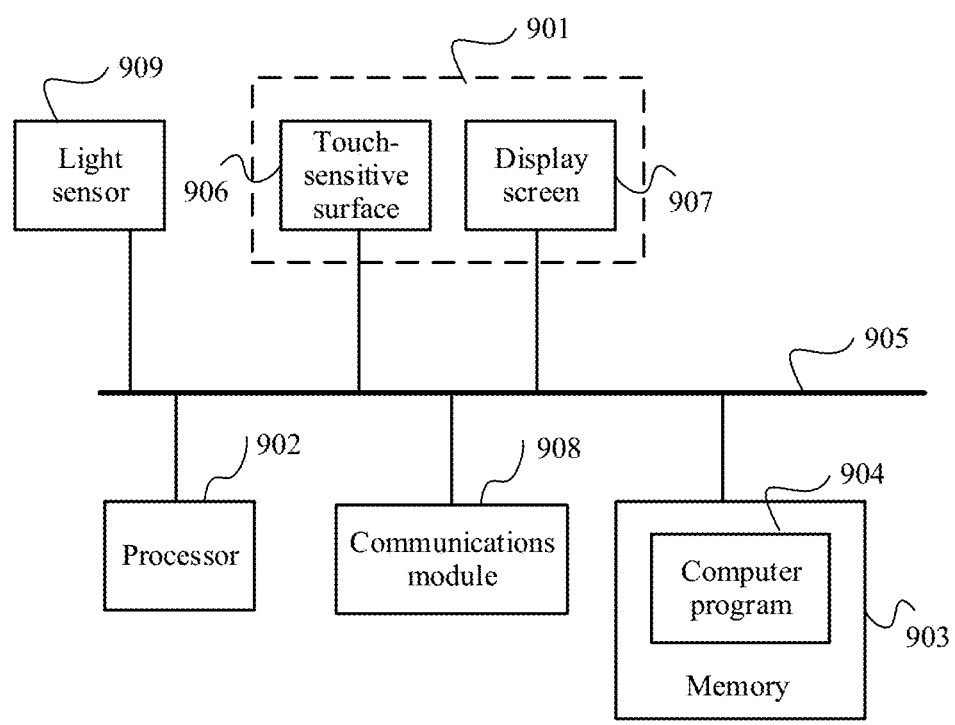
FIG. 9 is a schematic diagram of a structure of an electronic device according to an embodiment of this application.

As shown in FIG. 9, an embodiment of this application discloses an electronic device, including a touchscreen 901, where the touchscreen 901 includes a touch-sensitive surface 906 and a display screen 907; one or more processors 902; a memory 903; a communications module 908; a light sensor 909; one or more applications (not shown); and one or more computer programs 904. The light sensor 909 is disposed under the display screen 907, and the components may be connected by using one or more communications buses 905. The one or more computer programs 904 are stored in the memory 903, and are configured to be executed by the one or more processors 902. The one or more computer programs 904 include instructions. The instructions may be used to perform the steps in the foregoing embodiments. For example, the instructions may be used to perform the steps shown in FIG. 5 to FIG. 8.

Based on the foregoing descriptions of the implementations, a person skilled in the art may clearly understand that for the purpose of convenient and brief descriptions, division into the foregoing function modules is merely used as an example for description. During actual application, the foregoing functions can be allocated to different function modules for implementation based on a requirement, that is, an inner structure of an apparatus is divided into different function modules to implement all or some of the functions described above. For detailed working processes of the foregoing system, apparatus, and unit, refer to corresponding processes in the foregoing method embodiments, and details are not described herein again.

Function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A light sensor status control method applied to an electronic device that includes an OLED display screen overlying a light sensor, the OLED display screen including a plurality of pixels in a display area of the display screen, the method comprising:
    determining, based on an image refresh frequency of the OLED display screen, an image refresh cycle first time period, the first time period including a third time period during which pixels in the display area corresponding to the light sensor are not to emit light in the image refresh cycle and a second time period that is a subset of the third time period, the second time period being smaller than the third time period;
    displaying, by the OLED display screen, a first frame of an image during a portion of the first time period of the image refresh cycle;
    directing the plurality of pixels in the display area and that corresponds to the light sensor to emit light in the second time period and to not emit light in the third time period;
    transmitting, by an optical transmitter of the light sensor, an optical signal in at least a part of the third time period and not transmitting an optical signal in the second time period based on a preset cycle when the OLED display screen is in a screen-off state;
    receive, by an optical receiver, a reflected optical signal arising from reflection of the transmitted optical signal; and
    determine, based on an attribute of the received optical signal, whether the optical signal was reflected by an object decreasing or increasing in separation distance relative to the electronic device, and to turn off the OLED display when the optical signal has been determined to be decreasing in separation distance.

2. The method according to claim 1, further comprising:
    displaying, by the OLED display screen, a second frame of an image in a fourth time period, the fourth time period comprising a fifth time period and a sixth time period;
    controlling the plurality of pixels in the display area corresponding to the light sensor to emit light in the fifth time period and to not emit light in the sixth time period; and
    not transmitting, by the light sensor, an optical signal in the fourth time period.

3. The method according to claim 1, further comprising determining whether the electronic device is in a call state or an outgoing call state.

4. The method according to claim 1, further comprising:
    monitoring a control signal or a pulse-width modulation signal of a drive IC of the OLED display screen;
    wherein the transmitting, by the light sensor, optical signal in at least part of the third time period, comprises:
    when determining, through monitoring that the control signal or the pulse-width modulation signal is switched to a low level, instructing an optical transmitter of the light sensor to transmit the optical signal.

5. An electronic device, comprising:
    a light sensor;
    an OLED display screen overlying the light sensor and including a plurality of pixels in a display area of the display screen;
    a processor; and
    a memory, the memory the memory storing instructions that, when executed by the processor, cause the electronic device to:
    determine, based on an image refresh frequency of the OLED display screen, an image refresh cycle first time period, the first time period including a third time period during which pixels in the display area corresponding to the light sensor are not to emit light in the image refresh cycle and a second time period that is a subset of the third time period, the second time period being smaller than the third time period;
    display on the OLED display screen a first frame of an image during a portion of the first time period of the image refresh cycle;
    control the plurality of pixels in the display area t and that corresponding to the light sensor to emit light in the second time period and to not emit light in the third time period;
    control an optical transmitter of the light sensor to transmit an optical signal in at least a part of third time period and to not transmit an optical signal in the second time period based on a preset cycle when the OLED display screen is in a screen-off state;
    receive a reflected optical signal arising from reflection of the transmitted optical signal; and
    determine, based on an attribute of the received optical signal, whether the reflected optical signal was reflected by an object decreasing or increasing in separation distance relative to the electronic device, and to turn off the OLED display when the optical signal has been determined to be decreasing in separation distance.

6. The electronic device according to claim 5, execution of the instructions by the processor causing the electronic device to:
    display on the OLED display screen a second frame of an image in a fourth time period, the fourth time period comprising a fifth time period and a sixth time period;
    control the plurality of pixels in the display area corresponding to the light sensor to cause the plurality of pixels in the display area to emit light in the fifth time period and to not emit light in the sixth time period; and control the optical transmitter of the light sensor to not transmit an optical signal in the fourth time period.

7. The electronic device according to claim 5, wherein execution of the instructions by the processor causes the electronic device to determine whether the device is in a call state or an outgoing call state.

8. The electronic device according to claim 5, wherein execution of the instructions by the processor causes the electronic device to:
  obtain a display synchronization signal of a drive IC of the OLED display screen; and
  control of the optical transmitter of the light sensor to transmit an optical signal in at least a part of third time period comprises instructing the optical transmitter of the light sensor to transmit optical signal in response to the obtained display synchronization signal.

9. A non-transitory computer-readable storage medium comprising a computer program having instructions that, when executed by a processor of an electronic device, cause the electronic device to perform the following the actions:
  determine, based on an image refresh frequency of an OLED display screen of the electronic device, an image refresh cycle first time period, the first time period including a third time period during which pixels in the display area corresponding to the light sensor are not to emit light in the image refresh cycle and a second time period that is a subset of the third time period, the second time period being smaller than the third time period;
  display, by the OLED display screen, a first frame of an image in a first time period, the first time period comprising a second time period and a third time period, the OLED display overlying a light sensor and including a plurality of pixels in a display of the display screen;
  directing a plurality of pixels in the OLED display and that corresponds to an optical transmitter of the light sensor to emit light in the second time period and to not emit light in the third time period;
  transmitting, by the optical transmitter of the light sensor, an optical signal in at least a part of the third time period and forego transmitting an optical signal in the second time period;
  control the optical transmitter of the light sensor to transmit an optical signal based on a preset cycle when the OLED display screen is in a screen-off state;
  receive a reflected optical signal arising from reflection of the transmitted optical signal; and
  determine, based on an attribute of the received optical signal, whether the reflected optical signal was reflected by an object decreasing or increasing in separation distance relative to the electronic device, and to turn off the OLED display when the optical signal has been determined to be decreasing in separation distance.

10. The computer-readable storage medium according to claim 9, wherein the instructions, when executed by the processor, cause the electronic device to perform actions including:
  displaying, by the OLED display screen, a second frame of an image in a fourth time period, the fourth time period comprising a fifth time period and a sixth time period;
  controlling the plurality of pixels in the display area corresponding to the optical transmitter of the light sensor to cause the plurality of pixels in the display area to emit light in the fifth time period and to not emit light in the sixth time period; and
  not transmitting, by the optical transmitter of the light sensor, an optical signal in the fourth time period.

11. The computer-readable storage medium according to claim 9, wherein the instructions, when executed by the processor, cause the electronic device to determine whether the electronic device is in a call state or an outgoing call state.

* * * * *